US010484032B2

(12) United States Patent
Nourbakhsh

(10) Patent No.: US 10,484,032 B2
(45) Date of Patent: *Nov. 19, 2019

(54) INTEGRATED NETWORKING EQUIPMENT AND DIVERSITY ANTENNA IN LIGHT BULB

(71) Applicant: BBY SOLUTIONS, INC., Richfield, MN (US)

(72) Inventor: Farhad Nourbakhsh, Apple Valley, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/006,383

(22) Filed: Jun. 12, 2018

(65) Prior Publication Data
US 2018/0294829 A1 Oct. 11, 2018

Related U.S. Application Data

(63) Continuation of application No. 13/829,536, filed on Mar. 14, 2013, now Pat. No. 10,020,833.

(51) Int. Cl.
*H04B 1/3827* (2015.01)
*H04B 1/38* (2015.01)
(Continued)

(52) U.S. Cl.
CPC .......... *H04B 1/3827* (2013.01); *F21K 9/232* (2016.08); *F21V 23/045* (2013.01); *H04B 1/38* (2013.01);
(Continued)

(58) Field of Classification Search
CPC ... H04B 1/3827; F21V 29/242; F21V 29/244; F21V 3/02; F21V 29/2293; F21V 17/06;
(Continued)

(56) References Cited

U.S. PATENT DOCUMENTS

| 6,373,447 B1 | 4/2002 | Rostoker et al. |
| 8,013,501 B2 | 9/2011 | Carroll et al. |
(Continued)

FOREIGN PATENT DOCUMENTS

| WO | WO-2013103698 A1 | 7/2013 |
| WO | WO-2014085124 A1 | 6/2014 |

OTHER PUBLICATIONS

"U.S. Appl. No. 13/829,536 Reply Brief filed Apr. 10, 2017", 8 pgs.
(Continued)

*Primary Examiner* — Jianxun Yang
(74) *Attorney, Agent, or Firm* — Schwegman Lundberg & Woessner, P.A.

(57) ABSTRACT

A light bulb or other lamp device incorporating improved antenna configurations and integrated networking equipment is described herein. In one example, a LED light bulb is arranged to include a wireless transceiver and related wireless network processing circuitry, and is coupled to multiple antennas configured to receive and transmit signals using spatial diversity, beamforming, multiple-input and multiple-output (MIMO), or other multi-antenna techniques. The heat sink in the light bulb may be purposed to provide one or more of the multiple antennas, such as use of respective heat sink structures to serve as a diversity antenna. The wireless network processing circuitry may be used for control of the light bulb or for operability with wireless and non-wireless networks. For example, the network processing circuitry may operate as a wireless network access point, repeater, relay, bridge, or like function.

22 Claims, 5 Drawing Sheets

(51) Int. Cl.

| | | |
|---|---|---|
| *F21V 23/04* | (2006.01) | |
| *F21K 9/232* | (2016.01) | |
| *H04W 88/08* | (2009.01) | |
| *F21V 29/74* | (2015.01) | |
| *F21Y 115/10* | (2016.01) | |
| *F21Y 107/00* | (2016.01) | |
| *F21V 3/06* | (2018.01) | |

(52) U.S. Cl.
CPC ............. *H04W 88/08* (2013.01); *F21V 3/061* (2018.02); *F21V 3/062* (2018.02); *F21V 29/74* (2015.01); *F21Y 2107/00* (2016.08); *F21Y 2115/10* (2016.08)

(58) Field of Classification Search
CPC . F21V 23/06; Y10S 362/801; H05B 37/0272; H01R 33/94; H01R 33/9453
See application file for complete search history.

(56) References Cited

U.S. PATENT DOCUMENTS

| | | |
|---|---|---|
| D654,602 S | 2/2012 | Carroll et al. |
| D664,684 S | 7/2012 | Carroll et al. |
| D664,685 S | 7/2012 | Carroll |
| 8,328,582 B1 | 12/2012 | Carley et al. |
| 8,331,854 B2 | 12/2012 | Rappaport |
| 8,371,722 B2 | 2/2013 | Carroll |
| 10,020,833 B2 | 7/2018 | Nourbakhsh |
| 2007/0201540 A1* | 8/2007 | Berkman ............... H04B 3/542 375/219 |
| 2008/0170371 A1 | 7/2008 | Lai |
| 2010/0056078 A1* | 3/2010 | Feldman ................. H01Q 1/06 455/90.3 |
| 2011/0006898 A1* | 1/2011 | Kruest ................ H01Q 1/2208 340/568.1 |
| 2011/0095687 A1 | 4/2011 | Jonsson |
| 2012/0274208 A1 | 11/2012 | Chen et al. |
| 2013/0148341 A1* | 6/2013 | Williams ................ F21S 9/022 362/184 |
| 2014/0273892 A1 | 9/2014 | Nourbakhsh |

OTHER PUBLICATIONS

"U.S. Appl. No. 13/829,536, Advisory Action dated Jul. 6, 2015", 4 pgs.
"U.S. Appl. No. 13/829,536, Appeal Brief filed Mar. 25, 2016", 24 pgs.
"U.S. Appl. No. 13/829,536, Appeal Decision dated Mar. 13, 2018", 7 pgs.
"U.S. Appl. No. 13/829,536, Final Office Action dated Apr. 22, 2015", 24 pgs.
"U.S. Appl. No. 13/829,536, Non Final Office Action dated Oct. 22, 2015", 17 pgs.
"U.S. Appl. No. 13/829,536, Non Final Office Action dated Dec. 3, 2014", 21 pgs.
"U.S. Appl. No. 13/829,536, Notice of Allowance dated Mar. 16, 2018", 7 pgs.
"U.S. Appl. No. 13/829,536, Response filed Mar. 3, 2015 to Non Final Office Action dated Dec. 3, 2014", 12 pgs.
"U.S. Appl. No. 13/829,536, Response filed Jun. 22, 2015 to Final Office Action dated Apr. 22, 2015", 10 pgs.
"U.S. Appl. No. 13/829,536, Response filed Aug. 11, 2015 to Advisory Action dated Jul. 6, 2015", 11 pgs.
"Motorola", AP-7131, (2011).
Cisco Systems, Inc., "Multipath and Diversity", (Jan. 21, 2008).
Cree, Inc., "Cree® XLamp® A19 Reference Overview", (2012), 12 pgs.
Osram Sylvania Inc., "Ultra LED A-line Lamps Omnidirectional", (2013), 3 pgs.

* cited by examiner

INTEGRATED NETWORKING EQUIPMENT AND DIVERSITY ANTENNA IN LIGHT BULB

CROSS-REFERENCE TO RELATED APPLICATIONS

The present application is a continuation of U.S. patent application Ser. No. 14/727,345, filed Jun. 1, 2015, which application is hereby incorporated by reference in its entirety.

TECHNICAL FIELD

Embodiments pertain to wireless networking equipment and related components used to conduct radio frequency (RF) communications. Some embodiments relate to networking equipment integrated into a light bulb form factor.

BACKGROUND

Some light bulbs include network communication components. For example, existing light emitting diode (LED) light bulbs include a wireless transceiver capable of receiving and transmitting communications employing a wireless local area network protocol, such as a Wi-Fi (IEEE 802.11 standard-compliant) protocol. The wireless network communications may be used to control the light bulb, for example, by turning the light element in the light bulb on or off, dimming the light, or changing the color of the light. In existing light bulb designs, the wireless transceiver is coupled to a small antenna that is typically located within the light bulb housing.

Such light bulbs may encounter wireless communication issues, as the light bulb configuration often limits the size and positioning of the antenna. For example, a light bulb may not be able to reliably communicate if the bulb is located a long distance from a wireless access point, such as on a different floor than the wireless access point. Also, the presence of multi-path fading, polarization effects, scatterers, attenuating media, and other signal degradation and noise may further hinder communication performance. Light bulbs located within fixtures may also experience reduced reception of communication signals and the wireless network communication range for the bulb.

DETAILED DESCRIPTION

Figure 1:
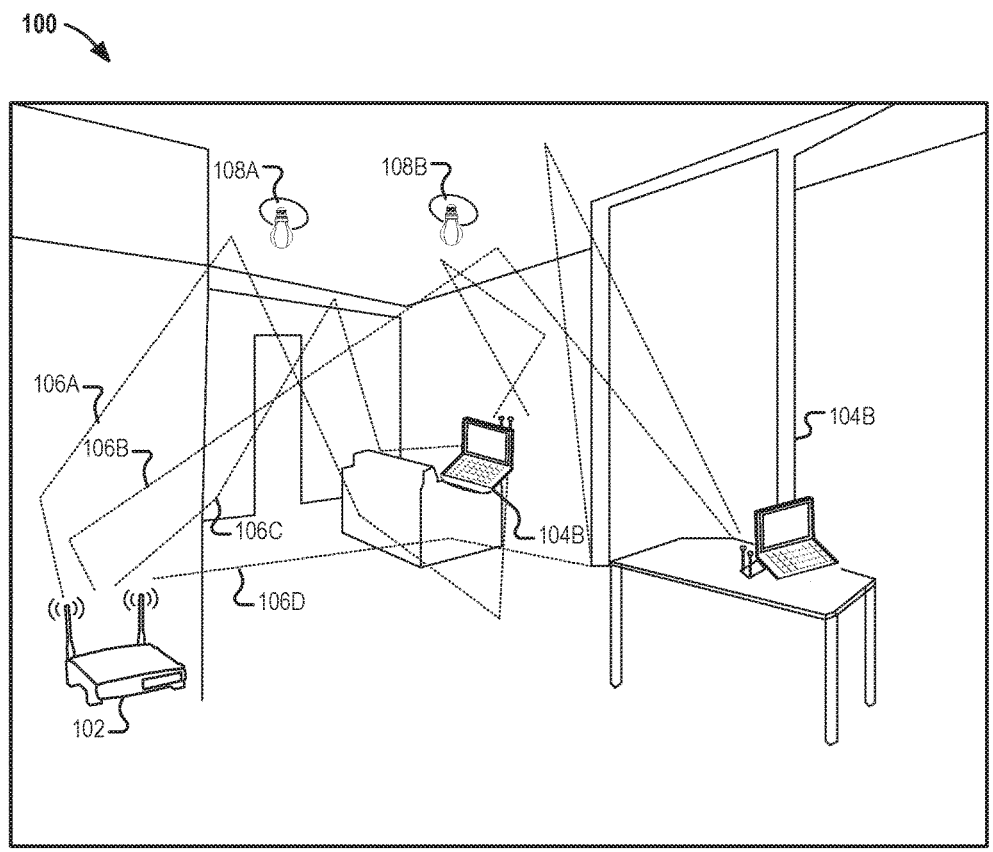
FIG. 1 illustrates a multipath wireless network communication scenario for devices in a wireless network, according to a further described example.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The structures described herein enable the use of lamp devices (e.g., light bulbs) and related light emitting devices for purposes of improved network communications. The light device configurations described herein include an integration of wireless networking equipment into a solid-state light bulb form factor. The light device configurations described herein also include an integration of multiple antennas into the solid-state light bulb form factor, useful for improved communications with wireless networks.

In one example, an LED light bulb can include respective heat sink portions, and such heat sink portions (e.g., respective heat sinks), may be configured as an array of antenna elements. Such an array can be operated in a manner to provide one or more of spatial diversity or polarization diversity, to enhance communication reliability in the presence of fading, scatterers, or attenuation. The Heat sinks in LED light bulbs may be arranged or shaped to provide thermal heat dissipation of the heat generated from LED elements within the bulb. A heat sink used in a LED light bulb may be made from a metallic, heat-conducting material, such as an aluminum alloy. Appropriate heat-conducting materials in the heat sink can be specified, sized, shaped, and arranged to provide desired radiation characteristics for wireless communication.

The use of multiple antennas and multiple antenna communication techniques, such as spatial diversity, beamforming, and like single-input multiple-output (SIMO), multiple-input single-output (MISO), and multiple-input and multiple-output (MIMO) variants, may be used to improve communication capabilities from wireless networking equipment housed in the light emitting device. For example, spatial diversity antenna techniques utilize more than one antenna at a receiver or transmitter in order to improve link reliability.

The use of spatial diversity antenna techniques may be well-suited to address multi-path transmission issues occurring inside of homes and buildings. In cases where wireless communications encounter multi-path signal degradation, RF signals bounce around obstacles in a room or structure and cause multiple signals to arrive at the antenna at slightly different times. This may cause a phase shift that can cancel or reduce the strength of the main signal. The use of spatial diversity techniques can result in a reduction to such distortion or attenuation of the signal. Similarly, a spatial diversity antenna configuration can also provide polarization diversity, because such multiple path propagation may also shift a polarization state of propagating electromagnetic energy.

The placement of wireless network equipment at light fixture locations, which are often located at central, elevated (and less-obstructed) locations, may address multi-path issues that would otherwise occur in the wireless network. Networking equipment integrated within light devices placed in lighting fixtures may assist network operations when used in a role such as an access point, bridge, repeater, relay, or the like. As also described below, the characteristics of solid-state lighting devices support the transmission of spatial diversity signals with multiple antennas, such as by using heat sinks employed within LED light bulbs as spatial diversity antennas.

FIG. 1 illustrates an example multi-path wireless network communication scenario 100, among devices in a wireless network. As illustrated, a wireless access point 102 (e.g., a Wi-Fi router) broadcasts or receives a variety of communication signals at different signal paths, 106A, 106B, 106C, 106D, for the exchange of communications with communication devices 104A, 104B. These signal paths may span across the interior room based on the location of the particular communication device and the wireless access point. The communication signals may reflect off a variety of structures, such as walls, ceilings, furniture, and the like.

As also shown in the communication scenario 100, each of the various signals 106A, 106B, 106C, 106D is reflected off the ceiling of the room. In particular, network equipment located at the ceiling or some high point of the room is likely to encounter less obstruction and multi-path interference. Ceiling mounted light bulbs 108A, 108B are positioned at an ideal location to have a good "view" of wireless devices in the room and communicate with other wireless devices with less interference, because a ceiling position is likely to provide a line-of-sight propagation to the communication devices 104A, 104B.

In a typical room or building, light bulbs having integrated networking equipment may provide an easy-to-install mechanism to facilitate and improve network communications within wireless networks. Light bulbs may be suited for wireless networking operations such as a central wireless access point, a repeater or relay for a wireless network (e.g., to serve as a wireless network extender), a bridge between different types of wireless networks, a bridge between a wireless network and a wired network (such as a power line or Ethernet network), and the like.

In the examples described herein, wireless networking components performing RF receiver and transmitter operations may be embedded in the bulb, to operate as the central wireless access point or repeater for the network. A LED light bulb provides a useful form factor that is receptive to use with a wireless networking equipment, with available internal space and relatively low heat compared to other types of light sources.

Multiple antennas may be integrated into a LED light bulb form factor in order to improve reception and transmission of the wireless communications. In one example, multiple heat sinks of an LED light bulb may be structured or arranged to provide independently-addressable antenna elements. The respective heat sinks may be isolated from each other to provide separate functioning antennas usable in a multi-antenna configuration, purposing all or a subset of the heat sinks as multiple antennas for use with the integrated networking equipment. Such antennas may be used to form a spatial diversity antenna configuration for diversity reception or transmit diversity (or both).

Antennas arranged in a configuration used for diversity reception utilize two or more antennas, positioned at a fixed distance apart from each other, with such distance established at least in part using information about a wavelength of the signal. For example, in a receiving scenario, respective antennas receive a slightly different signal strength, phase, or polarization. A receiver circuit can select among the respective antennas, selecting the antenna with the highest quality signal. In some configurations, the receiver circuit can combine signals received from the respective antennas to provide a composite received signal having signal characteristics that are improved as compared to a signal received from any one of the respective antennas, alone.

Likewise, antennas arranged in a configuration for transmit diversity utilize two or more antennas to transmit the same information from multiple antennas, for receipt at another device utilizing diversity reception. The respective heat sinks that are purposed into the heat sinks as respective antennas, may be used for both diversity reception and transmit diversity.

The shape and directionality of the heat sinks and the use of multiple antennas may also be used to assist with beam-forming (directional diversity) of the RF signal. Further, the multiple antennas may be used in connection with other variants of single-input multiple-output (SIMO), multiple-input single-output (MISO), or multiple-input multiple-output (MIMO) techniques, to improve reliability and throughput in data transmissions. "Spatial diversity" as used herein does not restrict antenna operation to one-at-a-time or mutually-exclusive operation.

Figure 2A:
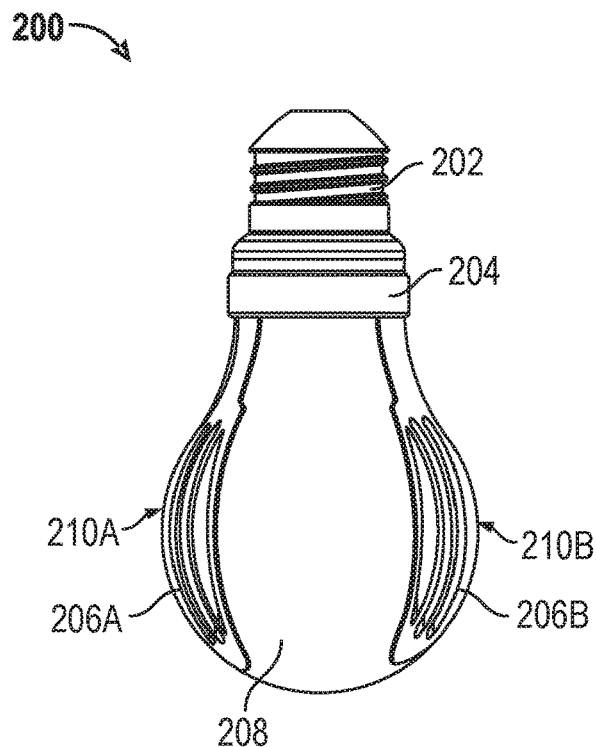
FIG. 2A illustrates an example shape of a light bulb including multiple antennas and configured for wireless communications according to a further described example.

FIG. 2A illustrates an example shape of a light bulb including multiple antennas configured for wireless communications according to some examples. FIG. 2A specifically illustrates a LED light bulb in a form factor similar to a full-size incandescent light bulb. The light bulb 200 includes a connection base 202 (e.g., a screw socket base for coupling to a E26 or E27 standard or medium "Edison" screw lamp socket or other couplable receptacle and socket configuration), a base assembly 204 including components for providing power from the connection base 202 to circuitry and lighting elements (not shown), a set of heat sinks 206A, 206B extending from the base assembly 204 to transfer and dissipate heat generated by the circuitry and lighting elements, and a glass or plastic bulb shell 208 to conceal and shelter components such as the circuitry and lighting elements.

Figure 2B:
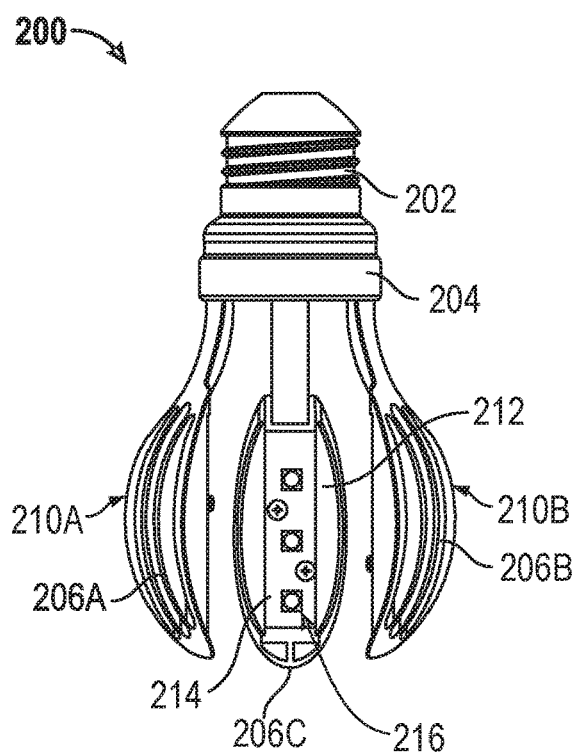
FIG. 2B illustrates a cut-away view of an example shape of a light bulb including multiple antennas and configured for wireless communications according to a further described example.

FIG. 2B illustrates a cut-away view of the light bulb 200 including multiple heat sinks purposed as multiple antennas for wireless communications according to a further described example. The light bulb 200, with its glass or plastic bulb shell omitted, shows three heat sinks 206A, 206B, and 206C. Each of the heat sinks 206A, 206B, 206C extends from the base assembly 204 to the rounded end of the bulb (defined by the bulb shell 208, not shown). The depicted heat sinks 206A, 206B include respective exterior sides 210A, 210B with grooves on the exterior surface protruding from the bulb shell (e.g., the bulb shell 208, not depicted) that are designed to dissipate heat, and interior sides such as an interior side 212 facing into the bulb shell for the mounting of the heat-generating light elements.

A set of light emitting elements 216 are provided on a LED light strip 214 that is in turn mounted to the surface of the interior side 212 of the heat sink 206C. The LED light strip 214 depicted in FIG. 2B illustrates three LED elements as an example, but the type, number, and shape of the LED light strip 214 and the LED elements will vary based on the light output, size, and shape of the light bulb.

Figure 2C:
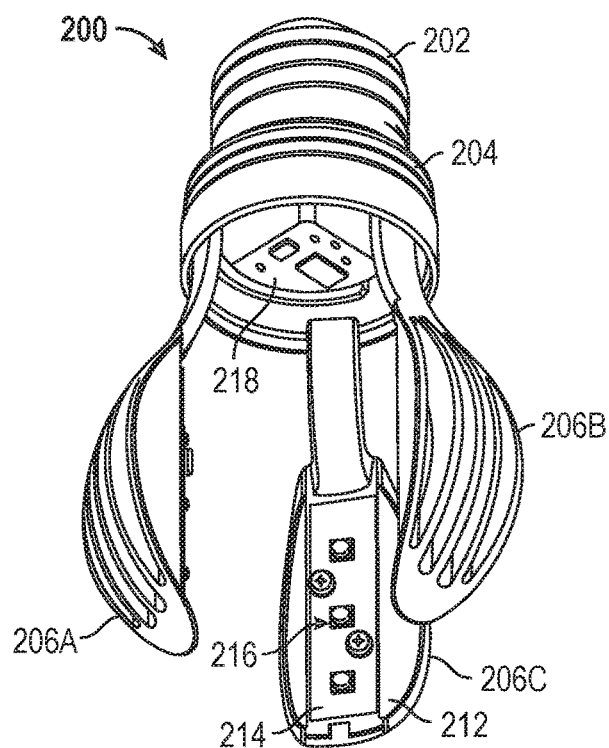
FIG. 2C illustrates a perspective view of an example shape of a light bulb including integrated network equipment and multiple antennas being configured for wireless communications according to a further described example.

FIG. 2C illustrates a perspective view of an example shape of a light bulb 200 including integrated network equipment and spatial diversity antennas configured for wireless communications according to a further described example. In addition to the structures depicted in FIGS. 2A and 2B, the light bulb 200 includes wireless communication circuitry 218. The wireless communication circuitry 218 may include a wireless transceiver (mounted on an associated circuit board, for example) disposed in a portion of the base assembly 204 for inclusion within the light bulb housing defined by the bulb shell (e.g., bulb shell 208, not depicted). The wireless communication circuitry 218 is coupled to an antenna provided by one or more of the heat sinks. In one example, the wireless communication circuitry 218 is coupled to two separate, unconnected heat sinks of the light bulb 200 (e.g., heat sinks 206A, 206C), for use of the two heat sinks respectively as spatial diversity antennas. In other examples, three, four, or more separate and unconnected heat sinks are used as antennas in connection with a multiple antenna communication technique.

Heat sinks are used to divert heat away from the LEDs and other electronic components of the light bulb. The heat sinks of the light bulb 200 are made of a suitable material to both dissipate heat generated from the LED elements and circuitry in the light bulb, while also serving as a material for radiating or receiving radiated RF energy as an antenna. In further examples, only some of the heat sinks are used as antennas. Further, the entire heat sink does not necessarily need to function as an antenna, but may be made with other heat-dissipating (and not RF conductive) materials such as ceramic materials. A heat sink may also be partially coated with materials suitable to RF reception and transmission. As another example, a portion of the heat sink can be configured (e.g., sized, shaped, and arranged) to radiate or received radiated energy efficiently, such as using one or more of a patch structure, a monopole configuration, an inverted-F configuration, a dipole configuration, or a slot configuration.

In further examples, the shape of the multiple heat sinks or the antenna may not directly correspond to the overall shape of the light bulb. The particular configuration of the heat sink arrangement and shape (and antenna materials in the heat sink) may be determined from a balance of factors including thermal management, light, and RF communication characteristics (e.g., input impedance, radiation efficiency). The particular spacing and sizes of the heat sinks (and antenna materials in the heat sinks) may be adapted based on the particular wavelength of the wireless network communications and the designated use of the wireless network equipment.

It will be understood that the heat sink, glass, or bulb configuration and arrangements depicted in FIGS. 2A, 2B, and 2C are provided as illustrative examples, and that the configurations and techniques for use with lamp devices are not limited to the ornamental or functional light bulb designs presented in FIGS. 2A, 2B, and 2C. Heat sinks in other light bulb configurations that do not converge or extend towards the tip of the bulb may be purposed as respective antennas in accordance with the techniques described herein. Likewise, consistent with the illustrated examples provided herein, a lamp device including wireless network processing circuitry may be integrated with ornamental and functional bulb designs that differ from FIGS. 2A, 2B, and 2C. Thus, integrated wireless network functionality and components may be incorporated into a wide variety of lamp devices.

Figure 3:
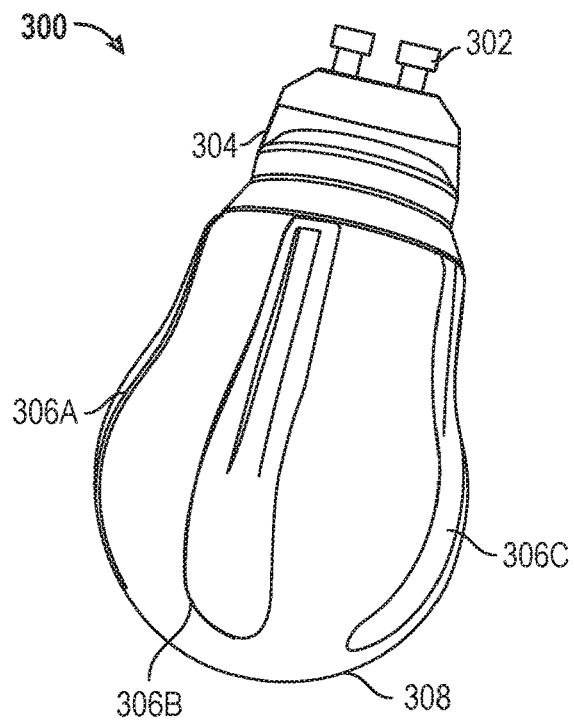
FIG. 3 illustrates another perspective view of an example shape of a light bulb including integrated network equipment and multiple antennas being configured for wireless communications according to a further described example.

FIG. 3 illustrates a perspective view of an example shape of a light bulb 300 including integrated network equipment and a diversity antenna according to a further described example. FIG. 3 is illustrated to include a base portion 304 having a multiple pin, bi-post socket base 302 (e.g., a "G"-type, GU-10 standard base) for coupling with a bi-post lamp socket or like lamp receptacle. Similar to the configuration of the light bulb 200 illustrated in FIGS. 2A-2C, the light bulb 300 in FIG. 3 includes a plurality of heat sink portions. The shape of the light bulb 300 is configured to include more than three heat sink portions extending from the base portion 304, such as four or more heat separate heat sinks (with three heat sinks 306A, 306B, and 306C visible in the illustrated perspective). The light bulb 300 further includes a glass or plastic bulb shell 308, shaped for functional or aesthetic purposes, to enclose the light source and internal componentry. Integrated network circuitry may be provided within the interior chamber similar to the illustration of FIG. 2C, at a location to not generally interfere with the distribution of the light.

The LED elements of the light bulb 300 may be located within the interior chamber defined by the glass or plastic shell 308, and need not be oriented directly on an interior portion of the respective heat sinks as depicted in FIGS. 2B and 2C. Depending on the form factor, LED elements may be positioned throughout the bulb shape, and connected to any number of separate or common heat sinks. Therefore, while FIG. 3 illustrates three visible heat sinks of a light bulb having four heat sinks, it will be understood that fewer or more heat sinks in different configurations may be employed. Further, the heat sinks may only extend along a portion of the outside bulb and are not required to converge towards a single point of the light bulb (e.g., a "top" rounded portion of the bulb shell 208, 308 of the light bulbs 200, 300).

FIGS. 2 and 3 each illustrate varying configurations of a standard-shaped light bulb. Although these figures depict a light bulb resembling an "A19" form factor having a multi-directional internal light source, it will be understood that the configurations described herein may be also applicable to other shapes and profiles of light bulbs and luminaires. These include, but are not limited to, lamp structures including flood bulbs, spotlight bulbs, candelabra bulbs, and the like.

Figure 4:
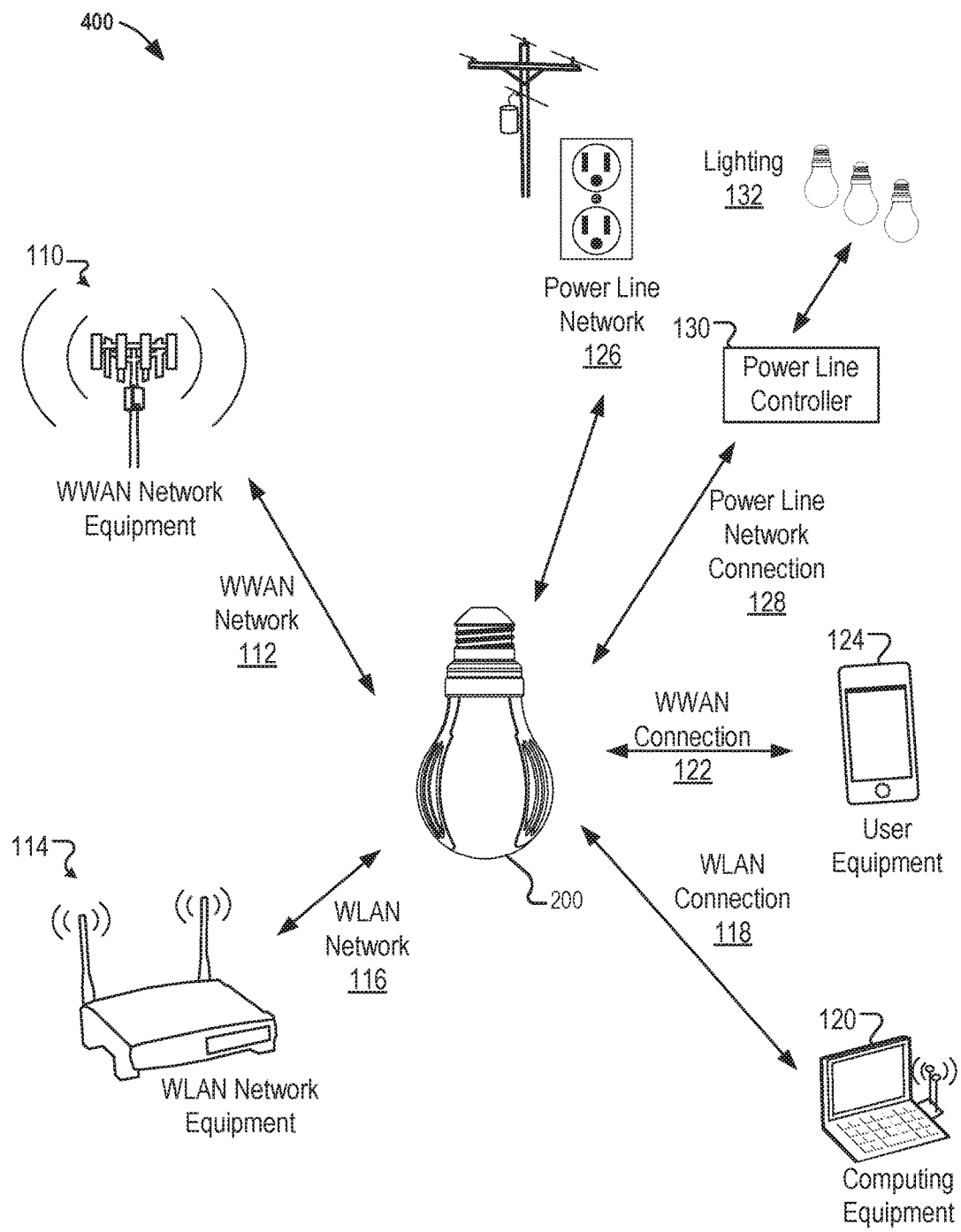
FIG. 4 illustrates example network communication paths for communications via a light bulb including integrated network equipment according to a further described example.

FIG. 4 provides a general illustration 400 of example network communication paths for wireless communications, in connection with a light bulb (e.g., the light bulb 200 illustrated in FIGS. 2A-2C) providing integrated network equipment according to a further described example. The integrated network equipment and circuitry (e.g., transceiver, antennas, processing circuitry, and the like) included in the light bulb 200 may be configured for operation with one or multiple of a wireless wide area network (WWAN) 112, a wireless local area network (WLAN) 116, a power line network 126, and other types of wireless and wired networks.

As a first example, involving use of a WWAN network 112, the light bulb may receive wireless communications from a carrier-based network (e.g., a Long Term Evolution (LTE)/Long Term Evolution-Advanced (LTE-A) cell network) originating from WWAN network equipment 110 (e.g., an LTE evolved NodeB (eNodeB)). The light bulb 200 may use its network processing circuitry to relay the wireless communications to a user equipment device 124 (e.g., a smartphone) via a locally established WWAN connection 122 using a WWAN protocol. The light bulb 200 may further relay wireless communications provided from the user equipment device 124 to the WWAN network equipment 110.

As a second example, involving use of a WLAN network 116, the light bulb 200 may receive wireless communications from a short-range wireless network a Wi-Fi network)

originating from a WLAN network equipment 114 (e.g., a Wi-Fi access point/base station). The light bulb 200 may then operate as a repeater of wireless communications to a computing device 120 via a locally established WLAN connection 118 using a WLAN protocol. The light bulb 200 may further relay wireless communications from the computing device 120 to other elements of the WLAN network 116.

As another example, involving use of a power line network 126, the light bulb 200 may receive wireless communications from a wireless network (such as the WWAN network 112 or the WLAN network 116) and transmit the communications to a power line network 126 (or other non-wireless network) such as through power line network connection 128. In this fashion, the communication circuitry in the light bulb 200 may operate as a bridge between a wireless network and components of a wired network, such as a power line controller 130 which in turn controls additional lighting elements 132 in the power line network 126. In yet other examples, the light bulb 200 may operate as a bridge between two types of wireless networks (for example, exchanging communications between the WWAN network 112 and the WLAN network 116).

Figure 5:
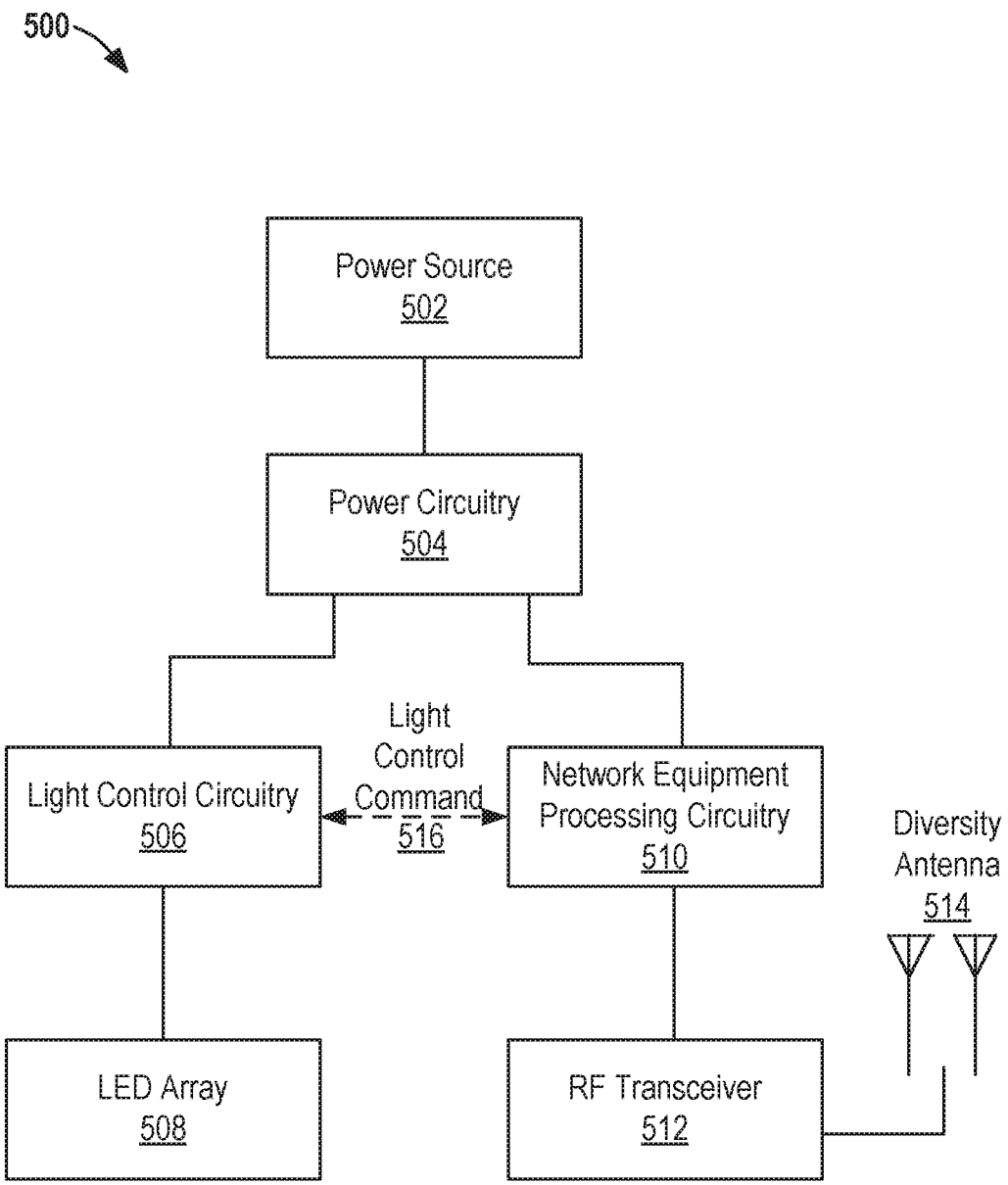
FIG. 5 illustrates an example structural diagram for a light bulb including integrated network equipment and diversity antennas according to a further described example.

FIG. 5 illustrates a structural block diagram of an LED light bulb device 500, including integrated network equipment and a diversity antenna according to a further described example. As shown, the light bulb device 500 includes (or may be coupled to) a power source 502, power circuitry 504, light control circuitry 506, one or more lighting elements (such as LED array 508), network equipment processing circuitry 510, and an RF transceiver 512. The light bulb device includes or is coupled to a diversity antenna 514.

The power source 502 operates to provide power to the power circuitry 504 for power of the light-generating elements as well as the network communication elements. Thus, the power circuitry provides power to the light control circuitry 506, and the network equipment processing circuitry 510. The light control circuitry 506 is used to control the LED array(s) 508 and the emission of light from the light bulb 500. The light control circuitry 506 may further operate to provide the suitable amount of light and control of the individual or groups of LED elements in the bulb.

In some examples, the light control circuitry is operably coupled to the network equipment processing circuitry 510 via one or more communication paths which enable the transmission of a light control command and associated commands or messages. For example, a power toggle command received via the network equipment processing circuitry 510 may be used to trigger a light control command 516, which then instructs the light control circuitry 506 to toggle the power on/off to the light element(s) (such as the LED array 508). As another example, the light control command 516 may be used to control the operation of particular LED elements, such as different colored LED elements (e.g., a command to change light color emitted by the bulb), or illumination intensity of particular LED elements (e.g., a command to dim the bulb).

The network equipment processing circuitry 510 is coupled to the RF transceiver 512. The network equipment processing circuitry 510 can operate to process incoming wireless networking messages at low and intermediate network layers, and generate outgoing messages for transmission to the wireless network(s). The RF transceiver 512 may include physical layer circuitry used to receive and transmit messages via the wireless network(s) and provide usable digital signal data to the network equipment processing circuitry 510. The RF transceiver 512 is coupled to a diversity antenna 514 which may be provided from a plurality (e.g., two or more) of heat sinks or other structure integrated into the shape of the light bulb 500.

Additional circuitry may be included in the light bulb 500. For example, additional elements may be added to the network equipment processing circuitry to facilitate operations via non-wireless networks (such as a power line transceiver)

The types of WWAN and WLAN wireless network described are not limited to the use of the examples provided above. A WWAN may operate according to a network protocol operating according to a LTE, LTE-A, High Speed Packet Access (HSPA), or other 3GPP standard network, an IEEE 802.16 WiMAX standard, or other suitable wide area network protocols and standard implementations. A WLAN may operate using a network protocol according to a standard from an IEEE 802.11 or 802.16 standards family, for example, a Wi-Fi network operating according to an 802.11a, 802.11b, 802.11g, 802.11n, or 802.11ac network. Communications of wireless personal area network (WPAN) implementations may be provided using a protocol operating according to a Bluetooth standard promulgated from the Bluetooth Special Interest Group (the term "Bluetooth" as used herein referring to a short-range digital communication protocol including a short-haul wireless protocol frequency-hopping spread-spectrum (FHSS) communication technique operating in the 2.4 GHz spectrum). The light bulb device may also be used as part of a device-to-device (D2D) or machine-to-machine (M2M) wireless network or variants of a peer-to-peer or ad-hoc wireless network that involve connections over a plurality of devices (e.g., connections involving multiple hops). Likewise, non-wireless networks useable in connection with the presently described light bulb devices are not limited to power line networks. The light bulb device may interface with or serve as a bridge for other type of wired connections (or networks involving both power line and non-power line mediums).

Uses of the antenna and specific antenna shapes may be determined in connection with the particular frequency and communication techniques employed by the communication network protocol. Thus, a heat sink which provides functionality for part of a diversity antenna may be arranged or shaped to support use of a particular frequency or communication technique.

Associated communication techniques may be incorporated in components, modules, or circuitry in a light bulb and other light emitting devices, such as a wireless network adapter, a wireless transceiver control, circuitry for such systems and devices, and in hardware and software implementations. Further, various methods or techniques, or certain aspects or portions of the functionality described herein, may take the form of program code (i.e., instructions) embodied in tangible media, such as flash memory or other machine-readable storage medium wherein, when the program code is loaded into and executed by a machine, such as a computer, the machine becomes an apparatus for practicing the various techniques. Appropriate circuitry to accomplish some of the operations described herein may be provided in connection with a computing device may include a microprocessor, a processor, a storage medium readable by the processor (including volatile and non-volatile memory and/or storage elements), at least one input device, and at least one output device.

The light bulb device may operate as a standalone device or may be connected (e.g., networked) to other devices. In a networked deployment, the device may operate in the capacity of either a server or a client machine in server-client network environments, or it may act as a peer machine in peer-to-peer (or distributed) network environments. The light bulb device may provide characteristics of a computing device, such as a web appliance, a network router, switch or bridge, or similar device capable of executing instructions (sequential or otherwise) that specify actions to be taken by that machine. Further, while only a single device is illustrated in numerous of the examples provided herein, the term "device" shall also be taken to include a machine or collection of machines that individually or jointly execute a set (or multiple sets) of instructions to perform any one or more of the methodologies discussed herein.

Instructions for operations of the light bulb device may be provided in connection with a machine-readable medium. While the machine-readable medium may be a single medium, the term "machine-readable medium" may include a single medium or multiple media that store the one or more instructions. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices.

Further processing instructions for the light bulb device may further be transmitted or received over a communications network (e.g., the WWAN, WLAN, WPAN) using a transmission medium via the network interface. The term "transmission medium" shall be taken to include any intangible medium that is capable of storing, encoding, or carrying instructions for execution by the device, and includes digital or analog communications signals or other intangible medium to facilitate communication of the device.

Other applicable network configurations may be included within the scope of the presently described communication networks. Although examples were provided with reference to a WWAN and WLAN, it will be understood that communications may also be facilitated using any number of PANs, LANs, and WANs, using other combinations of wired or wireless transmission mediums.

It should be understood that the functional units or capabilities described in this specification may have been referred to or labeled as elements, components, or modules, in order to more particularly emphasize their implementation independence. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided herein. The following claims are hereby incorporated into the detailed description, with each claim standing on its own as a separate example or embodiment.

What is claimed is:

1. A lamp device, comprising:
   a base, the base including a connector to connect with a power source;
   a bulb structure, the bulb structure extended from the base;
   first and second solid-state lighting elements electrically connected to the connector of the base to receive electrical power from the power source, the first and second solid-state lighting elements being coupled to the bulb structure in an arrangement to disperse light from the lamp device;
   a radio frequency (RF) transceiver coupled to the first solid-state lighting element and the second solid-state lighting element;
   a first antenna provided by a first portion of the bulb structure, the first antenna being coupled to the RF transceiver, and a second antenna provided by a second portion of the bulb structure, the second antenna being coupled to the RF transceiver and isolated from the first antenna to function independently in a multi-antenna configuration; and
   wherein the RF transceiver is arranged to use the first antenna and the second antenna in the multi-antenna configuration to provide transmission and reception of respective RF signals.

2. The lamp device of claim 1, wherein the first and second solid-state lighting elements each include one or more light emitting diodes.

3. The lamp device of claim 1, wherein the bulb structure has an A form factor.

4. The lamp device of claim 1, wherein the first antenna is provided by a first heat sink that includes RF conductive material to emit and receive RF energy from the respective RF signals, and the second antenna is provided by a second heat sink that includes RF conductive material to emit and receive RF energy from the respective RF signals.

5. The lamp device of claim 1, further comprising network equipment processing circuitry, wherein the RF transceiver is electrically connected to the network equipment processing circuitry, and wherein the network equipment processing circuitry and the RF transceiver is arranged on a circuit board.

6. The lamp device of claim 5, wherein the network equipment processing circuitry is configured for providing wireless communications of a wireless local area network according to a standard from an IEEE 802.11 standards family.

7. The lamp device of claim 1, wherein the lamp device is a luminaire.

8. A light emitting diode (LED) device, comprising:
a base assembly configured for connection with an electrical source;
a bulb structure, the bulb structure extended from the base assembly;
a first LED array electrically connected to the base assembly via light control circuitry, the first LED array being coupled to the bulb structure in a first arrangement to disperse light in a first direction from the LED device;
a second LED array electrically connected to the base assembly via the light control circuitry and isolated from the first LED array, the second LED array being coupled to the bulb structure in a second arrangement to disperse light in a second direction from the LED device;
a first antenna provided by a first portion of the bulb structure, the first antenna being coupled to network equipment processing circuitry that is electrically connected to the light control circuitry to operate the first LED array;
a second antenna provided by a second portion of the bulb structure, the second antenna being coupled to the network equipment processing circuitry to operate the second LED array; and
a radio frequency (RF) transceiver electrically connected to the first antenna and the second antenna for transmission and receiving of RF energy.

9. The LED device of claim 8, wherein the base assembly is an Edison screw socket base or a multiple pin socket base, the base assembly being configured for attachment to a light receptacle.

10. The LED device of claim 8, wherein the LED device is a luminaire.

11. The LED device of claim 8, wherein the light control circuitry is controllable based on a light control command provided from the network equipment processing circuitry, wherein the light control command is configured to control light output from the first LED array or the second LED array, including one or more of: light intensity, light color, light on/off, wherein the light control command is determined from a signal received by the RF transceiver.

12. The LED device of claim 8, wherein the first antenna and the second antenna are spatial diversity antennas.

13. The LED device of claim 8, wherein the first antenna is provided by a first heat sink portion of the bulb structure that includes RF conductive material to emit and receive RF energy, and the second antenna is provided by a second heat sink portion of the bulb structure that includes RE conductive material to emit and receive RF energy.

14. A solid-state light device, comprising:
solid-state lighting elements coupled to respective portions of a bulb structure;
an array of antennas provided by the respective portions of the bulb structure that are coupled to the solid-state lighting elements, wherein antennas in the array of antennas are isolated from each other and function independently in a multi-antenna configuration, and wherein each antenna in the array of antennas is integrated into a separate portion of the bulb structure;
a radio frequency (RF) transceiver including physical layer circuitry arranged to perform communications with a wireless network using the array of antennas in the multi-antenna configuration; and
wireless network processing circuitry configured to communicate with a plurality of devices by reception and emission of the communications via multiple antennas of the array of antennas.

15. The solid-state light device of claim 14, wherein the solid-state lighting elements include a plurality of light emitting diode (LED) elements arranged to disperse light from the bulb structure.

16. The solid-state light device of claim 14, wherein at least one antenna of the array of antennas is provided by a heat sink provided from a metallic alloy capable of emitting and receiving RF energy in connection with the RF transceiver.

17. The solid-state light device of claim 14, the wireless network processing circuitry further arranged to process wireless network transmissions received from the array of antennas.

18. The solid-state light device of claim 17, the wireless network processing circuitry further arranged to generate wireless network transmissions for transmission with beamforming using the array of antennas.

19. The solid-state light device of claim 14, the wireless network processing circuitry further arranged to perform operations to bridge communications between a wireless wide area network (WWAN) and a wireless local area network (WLAN).

20. The solid-state light device of claim 14, the wireless network processing circuitry arranged to perform operations to bridge communications between a wireless network and a power line network.

21. The solid-state light device of claim 14, wherein the bulb structure has one of an A form factor or GU form factor.

22. The solid-state light device of claim 14, wherein the solid-state light device is a luminaire.

* * * * *